United States Patent
Rivera

(10) Patent No.: US 8,375,100 B1
(45) Date of Patent: Feb. 12, 2013

(54) SYSTEMS AND METHODS FOR SENDING CONSOLIDATED ELECTRONIC MAIL MESSAGES

(75) Inventor: Matthew Ismael Rivera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 346 days.

(21) Appl. No.: 12/133,615

(22) Filed: Jun. 5, 2008

(51) Int. Cl.
*G06F 15/16* (2006.01)

(52) U.S. Cl. ........................ 709/207; 709/206

(58) Field of Classification Search .................. 709/206, 709/207; 705/14.66, 14.67, 14.73, 14.17, 705/27

See application file for complete search history.

(56) References Cited

U.S. PATENT DOCUMENTS

| | | | |
|---|---|---|---|
| 6,317,718 B1* | 11/2001 | Fano | 705/14.39 |
| 6,721,716 B1 | 4/2004 | Gross | |
| 6,845,370 B2* | 1/2005 | Burkey et al. | 707/749 |
| 6,988,239 B2* | 1/2006 | Womble et al. | 715/205 |
| 7,143,118 B2 | 11/2006 | Eichstaedt et al. | |
| 7,149,741 B2* | 12/2006 | Burkey et al. | 1/1 |
| 7,200,633 B2 | 4/2007 | Sekiguchi et al. | |
| 7,720,211 B1* | 5/2010 | Winner et al. | 379/201.12 |
| 8,108,418 B2* | 1/2012 | Burkey et al. | 707/769 |
| 2003/0069892 A1 | 4/2003 | Hind et al. | |
| 2004/0117255 A1* | 6/2004 | Nemirofsky et al. | 705/14 |
| 2004/0204044 A1* | 10/2004 | Pinsky et al. | 455/556.1 |
| 2004/0230593 A1 | 11/2004 | Rudin et al. | |
| 2005/0091118 A1* | 4/2005 | Fano | 705/26 |
| 2005/0108747 A1 | 5/2005 | Omoigui | |
| 2005/0159974 A1* | 7/2005 | Moss et al. | 705/1 |
| 2005/0160004 A1* | 7/2005 | Moss et al. | 705/14 |
| 2005/0160014 A1* | 7/2005 | Moss et al. | 705/26 |
| 2006/0200832 A1 | 9/2006 | Dutton | |
| 2006/0224715 A1 | 10/2006 | Ajima et al. | |
| 2007/0011148 A1* | 1/2007 | Burkey et al. | 707/3 |
| 2007/0250784 A1 | 10/2007 | Riley et al. | |
| 2007/0263841 A1 | 11/2007 | Li | |
| 2007/0299728 A1* | 12/2007 | Nemirofsky et al. | 705/14 |
| 2008/0177616 A1* | 7/2008 | Nemirofsky et al. | 705/10 |
| 2008/0288606 A1 | 11/2008 | Kasai et al. | |
| 2009/0055498 A1* | 2/2009 | Brown | 709/207 |
| 2009/0055499 A1* | 2/2009 | Brown | 709/207 |
| 2009/0089193 A1* | 4/2009 | Paintin | 705/34 |
| 2009/0138562 A1 | 5/2009 | Schmulen et al. | |

(Continued)

OTHER PUBLICATIONS

Webb, Joe. "SQL Server Notification Services Architecture" SQLServerCentral.com, Nov. 30, 2005. Retrieved from the internet <URL: http://www.sqlservercentral.com/articles/2000+-+Misc/sqlservernotificationservicesarchitecture/2148/>. pp. 1-6.

"Travel at UBC" [Retrieved on Jan. 29, 2008], Retrieved from the internet <URL: http//www.supplymanagement.ubc.ca/>.

*Primary Examiner* — Ario Etienne
*Assistant Examiner* — Sargon Nano
(74) *Attorney, Agent, or Firm* — Brooks, Cameron & Huebsch, PLLC

(57) ABSTRACT

An organization generates for each member a plurality of pieces of information (datums) to be sent to the member. The organization consolidates a plurality of the datums for the member into a single message by allowing the member to set a rule with a message service for receiving messages therefrom. The set rule specifies how to consolidate at least some of the datums from the organization into the single message. Datums from the organization to be sent to the member are then accumulated, and the set rule is employed to construct each received message having at least some of the accumulated datums consolidated thereinto.

21 Claims, 3 Drawing Sheets

U.S. PATENT DOCUMENTS

| | | |
|---|---|---|
| 2009/0222527 A1 | 9/2009 | Arconati et al. |
| 2009/0319342 A1 | 12/2009 | Shilman et al. |
| 2010/0017491 A1 | 1/2010 | Johns et al. |
| 2010/0306104 A1 * | 12/2010 | Johnson ......................... 705/40 |

* cited by examiner

SYSTEMS AND METHODS FOR SENDING CONSOLIDATED ELECTRONIC MAIL MESSAGES

CROSS REFERENCE TO RELATED APPLICATIONS

This application is related to U.S. patent application Ser. No. 12/238,814 filed Sep. 26, 2008, and U.S. patent application Ser. No. 12/238,846 filed Sep. 26, 2008, filed as divisional applications of the instant application, the disclosures of which are incorporated in their entirety.

FIELD

The present disclosure is directed to systems and methods that send electronic mail messages each having therein a consolidation of reminders, notes, communications, and the like from an organization. More particularly, the present disclosure is directed to such systems and methods that consolidate the reminders, notes, communications, and the like from the organization into the message according to a predetermined schedule as set by the organization or by a recipient of the message.

BACKGROUND

An organization may have members, customers, client, or the like (hereinafter, 'members') that purchase and/or otherwise employ products and services (hereinafter, 'products') from among multiple lines of business of the organization. For one example, the organization may be a news gathering organization that publishes multiple newspapers, that offers related products such as a classified advertising service, an obituary service, a column service, a headlines service, a ticker service, and the like, and that also offers other products including catalogs, clothing, gathered information, and the like. For another example, the organization may be a financial services organization that offers multiple lines of insurance, banking line, a credit card line, a mutual funds line, a brokerage services line, a retail buying service line, and the like.

In any such instance, the organization may distribute to each member thereof electronic mail messages regarding the products of the organization. For example, and with regard to the aforementioned news gathering organization, each distributed message may be targeted to certain ones of the members thereof, and may be directed toward a particular datum or other piece of information from the news organization, such as a particular daily collection of news items to be delivered to the member, a particular breaking news update, one or more particular news columns requested by the member, an offer for a news product that may be of interest to the member, an offer for clothing from a line offered by the news organization, a notice that a monthly bill of the member is now available in an electronic form, a notice that such a bill has been sent to the member by regular mail, a notice that payment for the bill has been received from the member, and the like.

With regard to the aforementioned financial services organization, and in a similar manner, each distributed message may also be targeted to certain ones of the members thereof, and may be directed toward a particular datum or other piece of information from the financial organization, such as a monthly statement for a bank account of a member, a monthly bill for an insurance product of the financial organization as purchased by the member, a notice that a yearly premium for such an insurance product has been set, a reminder that tax information for the member is now available, a notice that a bill of the organization for a credit account of the member is now due, and the like, a notice that a particular bill of the member is now available in an electronic form, a notice that such a bill has been sent to the member by regular mail, a notice that payment for such a bill has been received, and the like.

In any instance, it is should be evident that even a single product from a single line of business of such an organization can generate a large amount of electronic mail messages being sent to the member, especially if each message is sent immediately when a particular datum for the member is available to be sent thereto. As should also be evident, if the member avails himself of multiple products from multiple lines of business of the organization, the number of electronic mail messages being sent to the member can multiply to an astounding level, again especially if each message is sent immediately when a particular datum for the member is available to be sent thereto.

Of course, the organization may consider the cost of each sent message to be trivial, especially inasmuch as each message is sent electronically and therefore does not require that postage or telecommunications charges be paid therefor. However, such costs for all of such messages over the course of a month or a year may not be trivial, especially when it is considered how much bandwidth much be employed to send the messages, the services, equipment, and personnel that must be dedicated to composing and sending such messages, storage space for storing such sent messages, legal requirements regarding the necessity of archiving the sent messages, and the like.

In a similar manner, a member of the organization receiving such messages may appreciate receiving same and being kept well informed regarding the organization and products thereat. However, the member may also find a relatively large number of the messages over a relatively short period of time to be excessive and even grating after awhile. Moreover, the member may also be required to devote considerable time to reading all the messages, and considerable resources to storing and archiving the messages.

Accordingly, a need exists for a system and method for sending electronic mail messages from an organization to a member thereof so as to minimize the number of messages. In particular, a need exists for such a system and method that consolidate multiple datums into each message. More particularly, a need exists for such a system and method whereby the member or the organization sets a predetermined schedule by which messages are sent, and each sent message includes datums accumulated since a previous sent message.

SUMMARY

The aforementioned needs are satisfied at least in part by a system and method for with regard to an organization that has a plurality of members. The organization generates for each member a plurality of pieces of information to be sent to the member, where each piece of information is a datum. The organization consolidates a plurality of the datums for the member into a single message by allowing the member to set a rule with a message service for receiving messages therefrom, and receiving the set rule. The received set rule specifies how to consolidate at least some of the datums from the organization into a single message. Each received message is constructed by the message service according to the set rule and has a plurality of datums consolidated thereinto. Datums from the organization to be sent to the member are then accumulated, and the set rule is employed to construct each received message having at least some of the accumulated datums consolidated thereinto.

In particular, upon receiving a datum for the member; the received datum is placed in a queue corresponding to the member; and the rule is retrieved and reviewed to determine how to act based on the received datum. the retrieved rule specifies that the received datum and at least some other accumulated datums in the queue are to be consolidated into one message and the one message is to be sent at a set time comprising one of a time of day, a time of week, and a time of month, or that the received datum and at least some other accumulated datums in the queue are to be consolidated into one message and the one message is to be sent when a set number of such datums accumulates for the member in the queue thereof.

If the retrieved rule specifies the set time, the message service waits until the set time to consolidate the received datum and the at least some other accumulated datums in the queue into the one message, consolidates the received datum and the at least some other accumulated datums in the queue into the one message at the set time, and sends such one message. If the retrieved rule specifies the set number, the message service determines whether the received datum and the at least some other accumulated datums in the queue amount to the set number, and if so consolidates the received datum and the at least some other accumulated datums in the queue into the one message and sends such one message.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
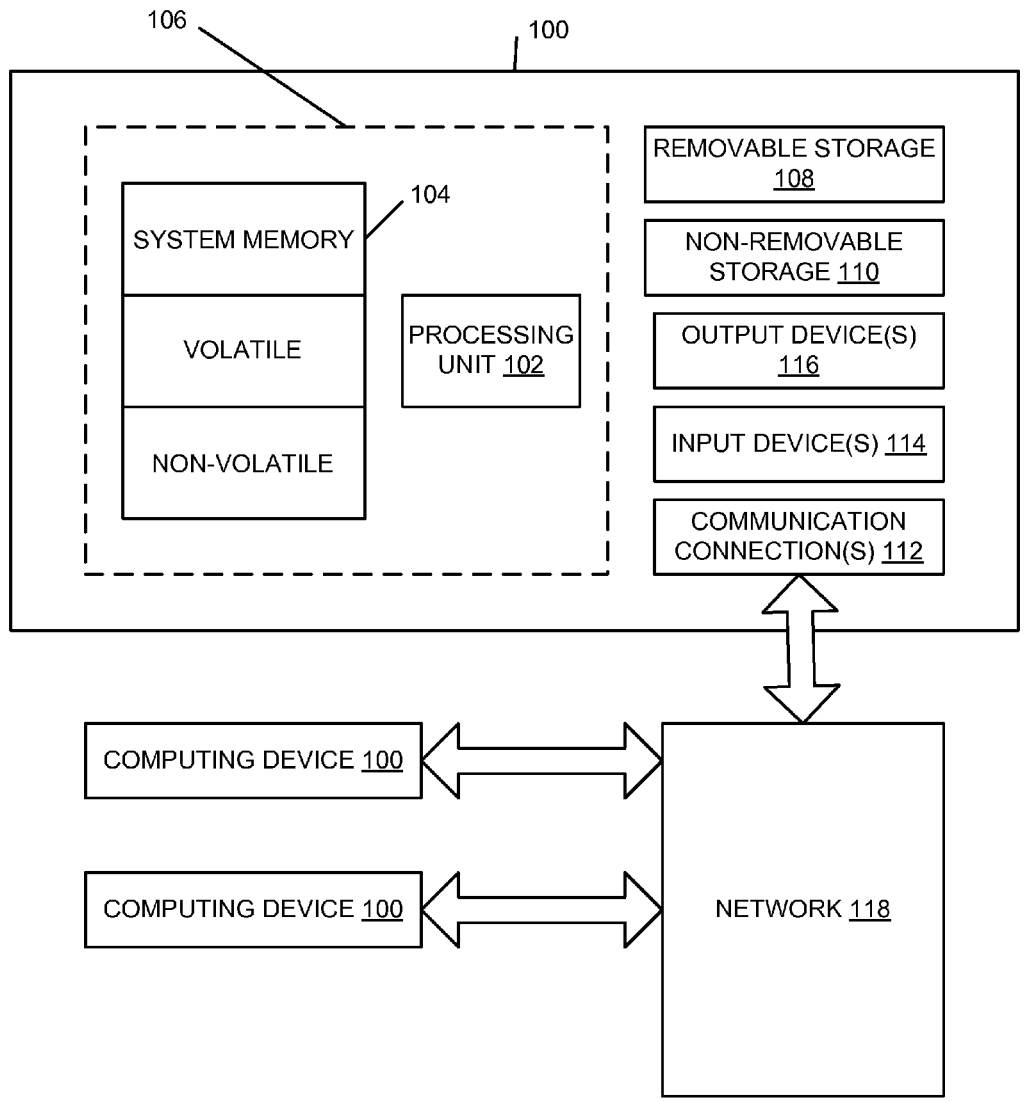
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Member Organization

Figure 2:
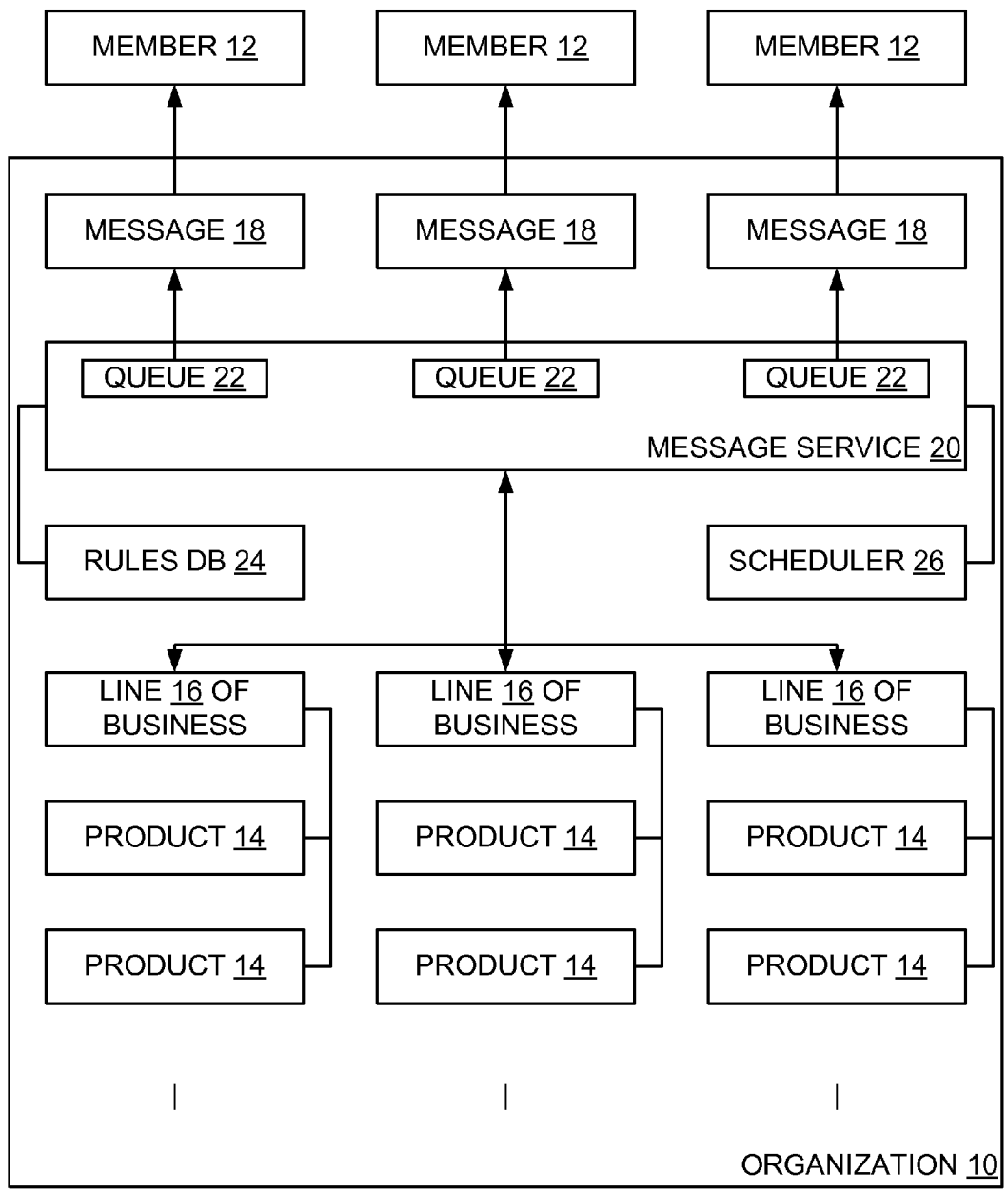
FIG. 2 is a block diagram of a system for sending consolidated electronic mail messages from an organization to a member thereof in accordance with various embodiments of the present innovation.

Turning now to FIG. 2, it is to be understood that various embodiments of the present innovation are especially applicable to an organization 10 having a plurality of members 12 that purchase and/or otherwise employ products and services (hereinafter, 'products') 14, especially from among multiple lines 16 of business. Note, though, that the various embodiments of the present innovation may also be applicable to alternate organizational structures without departing from the spirit and scope of the present innovation. For example, member 12 could include individual and/or business customers and other purchasers of the products 14 from the organization 10, and the lines 16 of business can be organized in most any manner or can be a single line 16 in appropriate circumstances.

It should be understood that the organization 10 may be any type of organization and offer most any type of products 14 without departing from the spirit and scope of the present innovation. For example, such organization 10 may be non-profit or for profit, and may be an association, corporation, a company, a collective, a firm, a conglomerate, or the like. Further, the products 14 of the organization 10 may be goods and services such as retail goods and services or even charitable goods and services.

Notably, the various embodiments of the present innovation are applicable to an organization 10 that offers one or more lines 16 of such products 14, such as for example a financial services organization 10 that offers multiple lines 16 of insurance, a banking line 16, a credit card line 16, a mutual funds line 16, a brokerage services line 16, and the like. Of course, the organization 10 that offers multiple lines 16 of products 14 may be any other type of organization without departing from the spirit and scope of the present innovation, such as for example an industrial organization 10, a multi-national organization, etc.

At any rate, the various embodiments of the present innovation are especially applicable in the situation where the organization 10 wishes to send electronic mail messages 18 from a message service 20 to each member 12. As may be appreciated, each message 18 to each member 12 may be with regard to most any aspect of the organization 10 and the lines 16 of business thereof. Accordingly, in an organization 10 that offers multiple lines 16 of products 14, it is to be appreciated that a member 12 of the organization 10 may at least potentially receive a relatively large number of electronic mail messages 18 regarding the products 14 and the lines 16 of business of the organization 10.

For example, and with regard to the aforementioned financial services organization 10, the member 12 may have one or more financial accounts from one or more of the multiple lines 16 of business of the organization 10, and the member 12 receives one or more statements each month for each account. In such a case, a message 18 may be sent to the member 12 with a particular one of the statements therein, a message 18 may be sent that the statement is available for electronic access, and/or a message 18 may be sent that the statement has been sent by regular mail, among other things. Also, if one account is a brokerage account, the member 12 may receive messages 18 regarding transactions performed, reminders to take actions, periodic balance summaries, suggestions for purchases or sales, suggestions for additional features that may be of interest, and the like. Similarly, if one account is a credit account, the member 12 may receive messages 18 regarding reminders to make payments, suggestions for credit purchases, account activity summaries, and the like.

As may be appreciated, additional messages 18 may also be sent to the customer 12 with regard to additional accounts, additional products from additional lines of business, and most any other matter pertinent or of interest to the member 12 and/or the organization 10. Of course, for other types of organizations other types of respective messages 18 may be sent to members 12 thereof. Accordingly, each such message 18 from the organization 10 may be most any message without departing from the spirit and scope of the present innovation.

Perhaps typically, the organization 10 may send a message 18 to a member 12 by way of the message service 20 for each piece of information or datum that is identified with regard to the member 12. For example, if a particular bill for the member 12 from a particular line 16 of business is available for access, the service 20 would send a corresponding message 18 to the member 12. Likewise, if payment for the bill has been received, the service 20 would send another corresponding message 18 to the member 12. In a similar manner, if another particular bill for the member 12 from another particular line 16 of business is available for access, the service 20 would send yet another corresponding message 18 to the member 12, and if payment for the another bill has been received, the service 20 would send still another corresponding message 18 to the member 12.

As should be appreciated then, as the number of products 14 obtained by the member 12 increases and the number of lines 16 of business with which the member 12 has a relationship increases, the number of messages 18 received by the member 12 from the message service 20 of the organization 10 also increases. Moreover, such increasing numbers of messages 18 can become overwhelming or annoying from the point of view of the member 12, perhaps to the point that the member 12 avoids or ignores the messages 18 from the organization 10.

Similarly, from the point of view of the organization 10, the increasing numbers of messages 18 that are sent to all members 12 over the course of a month or a year may become costly. As was pointed out above, such messages 18 require sending bandwidth, dedicated services, equipment, and personnel, storage space for storing such sent messages 18, archiving space to archive the sent messages 18, and the like.

Sending Consolidated Electronic Mail Reminder Messages

Accordingly, in various embodiments of the present innovation, the message service 20 of the organization 10, receives multiple datums for each member 12 in connection with the various lines 16 of business of the organization, and for each member 12 consolidates the multiple datums therefor into each message 18 sent to such member 12. As a result, the message service 20 sends fewer messages 18 and each member 12 likewise receives fewer messages 18.

As should be understood, each datum for a member 12 may be any appropriate piece of information without departing from the spirit and scope of the innovation. For example, the datum may be from any line 16 of business of the organization 10 or from a source within the organization 10 that need not necessarily be categorized as being aligned with any particular line 16 of business. Moreover, the datum may convey any particular information, including a message, a suggestion, a warning, or the like, and may be with regard to a bill, a renewal, a change, a request to make a change, a notice, delivery of papers, or the like. Additionally, the datum may include substantive information, may refer to a location where substantive information may be found, may note that substantive information has been received, may note that substantive information is being delivered by regular or overnight mail, or the like.

Each datum may be sent by the organization 10 to a respective member 12 at the direction of the member 12 or at the direction of the organization 10. In the former case, the member 12 may sign up to receive particular kinds of datums, or a variety of kinds of datums. In the latter case, the organization 10 may be sending a datum to a member 12 for a purpose deemed worthy by the organization 10, such as to inform the member 12 of important information or of a product 14 available for the member 12.

A member 12 may choose to receive messages 18 with multiple datums or the organization 10 may on its own determine to send such messages 18 with multiple datums, without departing from the spirit and scope of the present innovation. In various embodiments of the present innovation, and turning not to FIG. 3, the member 12 may access the message service 20 by way of an appropriate electronic interface (301) and with such access set rules for receiving such messages 18 with multiple datums (303). Such rules may be any rules deemed necessary or appropriate by the organization 10 without departing from the spirit and scope of the present innovation. As seen in FIG. 2, such rules are stored in an appropriate rules database 24

For example, one rule may be to determine how to consolidate multiple datums into each message 18 (305). Such consolidating choices may be any appropriate choices without departing from the spirit and scope of the present innovation. For one example, the member 12 may select to consolidate all available datums from the organization 10 into one message 18 and deliver the message at an appropriate time. For another example, the member 12 may select to consolidate all available datums of a particular kind from the organization 10 into one message 18 and deliver the message at an appropriate time. For still another example, the member 12 may select to consolidate all available datums from a particular line 16 of business of the organization 10 into one message 18 and deliver the message at an appropriate time.

As should be understood, the time in each case may for example be a set time such as once a week on a particular day of the week and at a particular time, once a month on a particular date of the month and at a particular time, or the like. Alternately, such time in each case may for example be whenever a set number of datums are accumulated, such as five or ten datums.

Note that provision should be made if any particular datum is time-sensitive. For example, a datum regarding a bill that is due on a particular due date should be sent out by the message service 20 well before such particular due date, and regardless of whether a set time has arrived or a set number of datums has accumulated. Thus, it may be that each datum as delivered to the message service may include a time by which the datum must be sent to the respective member 12.

Figure 3:
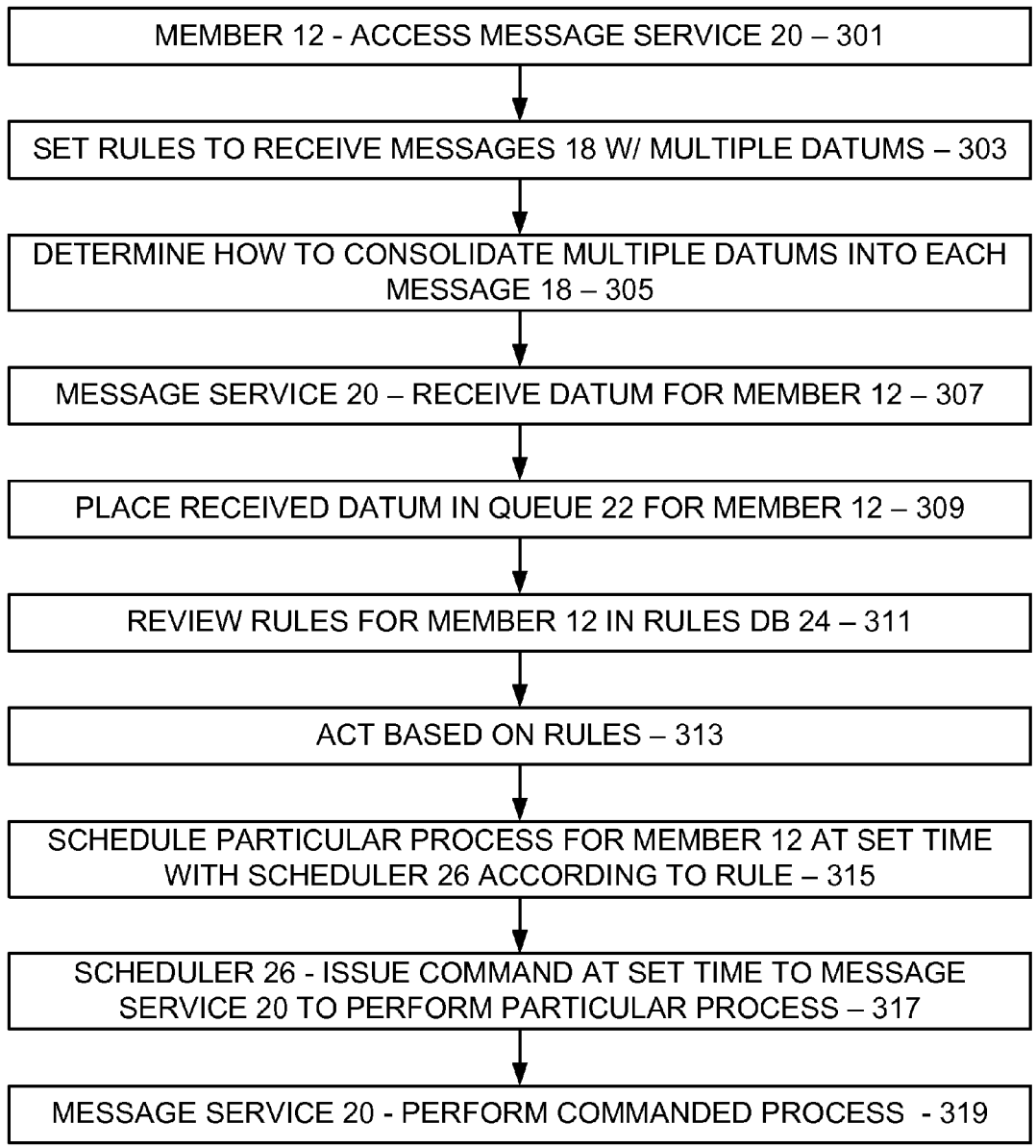
FIG. 3 is a flow diagram showing actions performed in connection with the system of FIG. 2 in accordance with various embodiments of the present innovation.

From the point of view of the message service 20, and still referring to FIG. 3, such message service 20 receives a datum for a particular member 12 from a line 16 of business of the organization 10 or from another part of the organization 10 (307). Upon receiving same, the message service 20 places such datum in a queue 22 (FIG. 2) corresponding to the member 12 (309), reviews the rules for the member 12 as set forth in the rules database 24 (311), and acts accordingly based on such rules (313).

Thus, if for example the rules for the member 12 show that the member 12 has elected to consolidate all available datums from the organization 10 into one message 18 and deliver the message at a set time, the message service 20 leaves the datum in the queue 22 of the member 12 for further processing at the set time. However, if for example the rules for the member 12 show that the member 12 has elected to consolidate all datums from a particular line 16 of business into one message 18 and deliver the message when the number of such datums accumulates to 5, the message service 20 determines whether 5 such datums exist in the queue 22 of the member 12, and if so the message service removes all such datums from such queue 22, consolidates the datums into a message 18, and sends the message 18 to the member 12 with such consolidated datums.

Inasmuch as the message service 20 still must process at least some of the datums in the queue 22 for the member 12 at a set time according to a rule of the member 12 as set forth in the rules database 24, and still referring to FIG. 3, the message service 20 may employ a scheduler 26 or the like to schedule such processing at or about such set time. In particular, based on such rule, the message service 20 may schedule a particular process for the member 12 at or about the set time with the scheduler 26 according to the corresponding rule (315), and at about the set time the scheduler 26 would issue to the message service 20 a command to perform the particular process for the member 12 (317).

Accordingly, in the aforementioned example where the member 12 has elected to consolidate all available datums from the organization 10 into one message 18 and deliver the message 18 at a set time, the message service 20 would perform such process at the set time as commanded by the scheduler 26 (319). In particular, at such set time, the message service 20 would remove all such datums from such queue 22, consolidate the datums into a message 18, and send the message 18 to the member 12 with such consolidated datums.

As should now be appreciated, the process performed by the message service 20 in response to a particular rule of a member 12 may be most any appropriate process without departing from the spirit and scope of the present innovation, presuming of course that the process indeed implements the corresponding rule. For example, if the rule requires sending a message 18 when 10 appropriate datums accumulate in the queue 22 of a member 12, the corresponding process would determine whether 10 such datums exist and if so would construct an appropriate message 18 to include such 10 datums. Note in this particular circumstance that if 11 datums were somehow found to exist, the message 18 could be constructed to include 10 of the 11 datums or could be constructed to include all 11 of the datums, although the latter is believed to be more likely.

CONCLUSION

Thus far, the various embodiments of the present innovation have been set forth primarily in terms of an organization 10 such as a financial organization. However, and as should be appreciated, the organization 10 may instead be any other type of organization, or even an individual if circumstances warrant. In a similar manner, although only single message service 20 and only a single scheduler 26 are shown in FIG. 2, other numbers of message services 20 and schedulers 24 may be employed, again if circumstances warrant. For example, if multiple defined types of members 12 exist, it may be that each type of member 12 has a corresponding message service 20. Likewise, it may be that each type of member 12 has a corresponding scheduler 26.

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a system and method are provided to define a message service 20 that sends electronic mail messages 18 from an organization 10 or the like to a member 12 thereof or the like so as to minimize the number of messages 18. In particular, such message service 20 consolidates multiple datums into each message 18 according to rules defined by the member 12 and stored in the rules database 24 available to the message service 20. The rules for the member 12 in the rules database 24 may set a predetermined schedule by which the messages 18 are sent, and each sent message 18 may include datums accumulated since a previous sent message 18.

It should be appreciated that changes could be made to the embodiments described above without departing from the innovative concepts thereof. For example although the rules database 24 and the scheduler 26 are shown as being separate from the message service 20, such rules database 24 and/or scheduler 26 may instead be incorporated within the message service 20 without departing from the spirit and scope of the present innovation. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable storage medium having computer-executable instructions thereon implementing a method with regard to a financial services organization having a plurality of members, the organization generating for each member a plurality of pieces of information to be sent to the member, each piece of information being a datum, the method comprising:

the member consolidating a plurality of the datums directed to a particular member into a single message, wherein consolidating includes:
accessing a message service of the organization by way of an electronic interface therewith;
setting a rule with the accessed message service for receiving financial services related messages therefrom, the set rule specifying how to consolidate at least some of the datums from the organization into a single financial services related message, each received message as constructed by the message service according to the set rule having a plurality of datums consolidated thereinto, the message service storing the set rule from the member in a rules database according to the member, accumulating datums from the organization to be sent to the member, and employing the set rule in the rules database to construct each received message having at least some of the accumulated datums consolidated thereinto;
specifying the set rule to include a threshold number of datums to be accumulated, wherein the threshold number of datums and all accumulated datums exceeding the threshold number of datums are included in the consolidated message; and
specifying the set rule so any accumulated datums from the organization which are time-sensitive are delivered before the time-sensitive time elapses.

2. The non-transitory computer readable medium of claim 1 wherein each message is an electronic mail message for being delivered to the member.

3. The non-transitory computer readable medium of claim 1 wherein the set rule specifies that all accumulated datums from the organization are consolidated into one message and the one message is delivered at a specified time.

4. The non-transitory computer readable medium of claim 1 wherein the set rule specifies that all accumulated datums of a particular kind from the organization are consolidated into one message and the one message is delivered at a specified time.

5. The non-transitory computer readable medium of claim 1 wherein the set rule specifies that all accumulated datums from a particular line of business of the organization are consolidated into one message and the one message is delivered at a specified time.

6. The non-transitory computer readable medium of claim 1 wherein the set rule specifies that at least some accumulated datums from the organization are consolidated into one message and the one message is delivered at a set time comprising one of a time of day, a time of week, and a time of month.

7. The non-transitory computer readable medium of claim 1 wherein the set rule specifies that at least some accumulated datums from the organization are consolidated into one message and the one message is delivered when a set number of such datums accumulates for the member at the message service.

8. A method with regard to a financial services organization having a plurality of members, the organization generating for each member a plurality of pieces of information to be sent to the member, each piece of information being a datum, the method comprising:
   the member consolidating a plurality of the datums directed to a particular member into a single financial services related message, wherein consolidating includes:
   accessing a message service of the organization by way of an electronic interface therewith;
   setting a rule with the accessed message service for receiving messages therefrom, the set rule specifying how to consolidate at least some of the datums from the organization into a single message, each received message as constructed by the message service according to the set rule having a plurality of datums consolidated thereinto, the message service storing the set rule from the member in a rules database according to the member, accumulating datums from the organization to be sent to the member, and employing the set rule in the rules database to construct each received message having at least some of the accumulated datums consolidated thereinto;
   specifying the set rule to include a threshold number of datums to be accumulated, wherein the threshold number of datums and all accumulated datums exceeding the threshold number of datums are included in the consolidated message; and
   specifying the set rule so any accumulated datums from the organization which are time-sensitive are delivered before the time-sensitive time elapses.

9. The method of claim 8 wherein each message is an electronic mail message for being delivered to the member.

10. The method of claim 8 wherein the set rule specifies that all accumulated datums from the organization are consolidated into one message and the one message is delivered at a specified time.

11. The method of claim 8 wherein the set rule specifies that all accumulated datums of a particular kind from the organization are consolidated into one message and the one message is delivered at a specified time.

12. The method of claim 8 wherein the set rule specifies that all accumulated datums from a particular line of business of the organization are consolidated into one message and the one message is delivered at a specified time.

13. The method of claim 8 wherein the set rule specifies that at least some accumulated datums from the organization are consolidated into one message and the one message is delivered at a set time comprising one of a time of day, a time of week, and a time of month.

14. The method of claim 8 wherein the set rule specifies that at least some accumulated datums from the organization are consolidated into one message and the one message is delivered when a set number of such datums accumulates for the member at the message service.

15. A system with regard to a financial services organization having a plurality of members, the organization generating for each member a plurality of pieces of information to be sent to the member, each piece of information being a datum, the system includes:
   a processor and memory;
   at least one module, deployed in the memory and executed by the processor, configured to allow the member to consolidate a plurality of the datums directed to a particular member into a single message by providing:
   access to a message service of the organization by way of an electronic interface therewith;
   a set rule with the accessed message service for receiving financial services related messages therefrom, the set rule specifying how to consolidate at least some of the datums from the organization into a single financial services related message, each received message as constructed by the message service according to the set rule having a plurality of datums consolidated thereinto, the message service storing the set rule from the member in a rules database according to the member, accumulating datums from the organization to be sent to the member, and employing the set rule in the rules database to construct each received message having at least some of the accumulated datums consolidated thereinto;
   the set rule specifies to include a threshold number of datums to be accumulated, wherein the threshold number of datums and all accumulated datums exceeding the threshold number of datums are included in the consolidated message; and
   the set rule specifies that any accumulated datums from the organization which are time-sensitive are delivered before the time-sensitive time elapses.

16. The system of claim 15 wherein each message is an electronic mail message for being delivered to the member.

17. The system of claim 15 wherein the set rule specifies that all accumulated datums from the organization are consolidated into one message and the one message is delivered at a specified time.

18. The system of claim 15 wherein the set rule specifies that all accumulated datums of a particular kind from the organization are consolidated into one message and the one message is delivered at a specified time.

19. The system of claim 15 wherein the set rule specifies that all accumulated datums from a particular line of business of the organization are consolidated into one message and the one message is delivered at a specified time.

20. The system of claim 15 wherein the set rule specifies that at least some accumulated datums from the organization are consolidated into one message and the one message is delivered at a set time comprising one of a time of day, a time of week, and a time of month.

21. The system of claim 15 wherein the set rule specifies that at least some accumulated datums from the organization are consolidated into one message and the one message is delivered when a set number of such datums accumulates for the member at the message service.

* * * * *